United States Patent [19]

Haglid

[11] 3,897,429

[45] July 29, 1975

[54] THIOL METHYLATION WITH METHYL BROMIDE

[75] Inventor: Frank R. Haglid, Wilmington, Del.

[73] Assignee: E. I. du Pont de Nemours & Company, Wilmington, Del.

[22] Filed: May 29, 1974

[21] Appl. No.: 474,436

Related U.S. Application Data

[63] Continuation-in-part of Ser. No. 417,070, Nov. 19, 1973, abandoned.

[52] U.S. Cl................................ 260/248 AS; 71/93
[51] Int. Cl............................................. C07d 55/10
[58] Field of Search............................. 260/248 AS

[56] References Cited
UNITED STATES PATENTS

| | | | |
|---|---|---|---|
| 3,135,737 | 6/1964 | Restivo........................... | 260/248 X |
| 3,671,523 | 6/1972 | Westphal et al.................. | 260/248 |

*Primary Examiner*—John M. Ford

[57] ABSTRACT

Compound A is methylated to produce Compound B in the presence of a base in aqueous medium using methyl bromide as the alkylating agent. A preferred embodiment of the process invention adds as a process step the regeneration of the methyl bromide. The alkali metal bromide salt, MBr, formed in this reaction is reacted with methanol and sulfuric acid to regenerate methyl bromide. A material balance of the two-step process yields a methylation process using methanol and sulfuric acid.

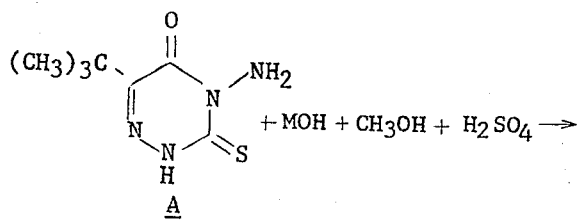

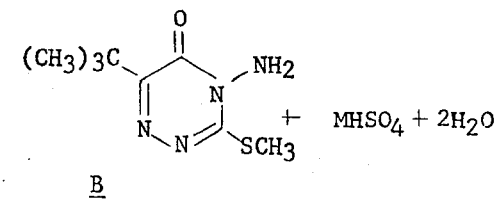

6 Claims, No Drawings

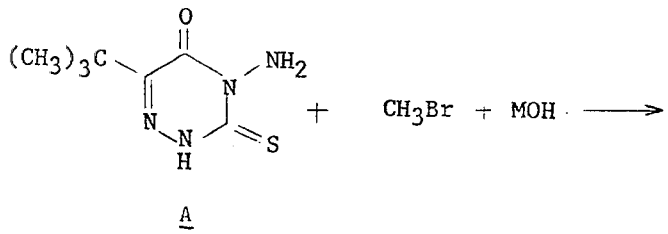

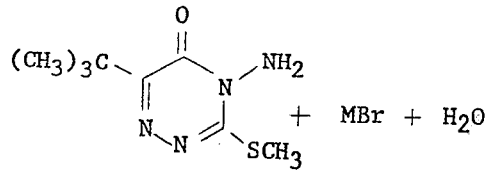

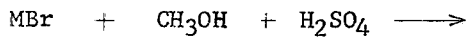

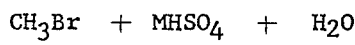

THIOL METHYLATION WITH METHYL BROMIDE

CROSS-REFERENCE TO RELATED APPLICATIONS

This application is a continuation-in-part of my copending Application Ser. No. 417,070, filed Nov. 19, 1973, now abandoned.

BACKGROUND OF THE INVENTION

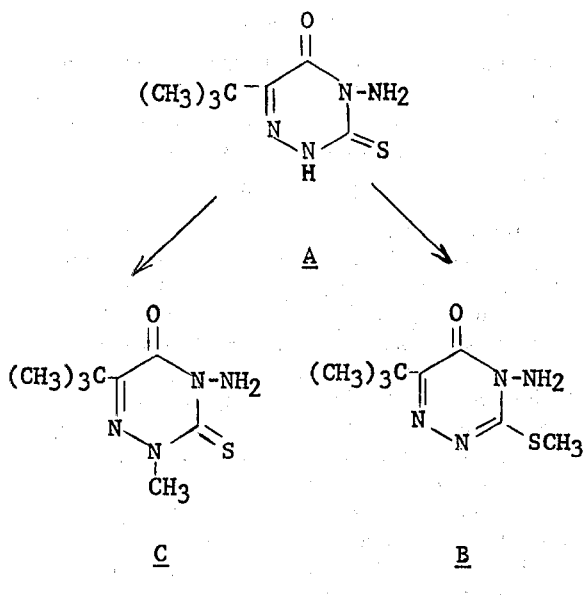

German Offenlegungsschrift 2,003,144 discloses the methylation of Compound A to Compound B, a selective herbicide, employing methyl iodide and sodium hydroxide in aqueous methanol. This reaction works well under a wide variety of conditions and, generally, only a small amount of the undesired by-product C is produced. However, the use of methyl iodide in large-scale manufacturing is not practical because of its cost and limited availability. Therefore, alternative methylating agents were sought.

It was found that commonly used, inexpensive methylating agents such as methyl chloride, dimethyl sulfate, and trimethyl phosphate all yielded mixtures of B and C containing from 25 to 77% C, depending on methylating agent and the reaction conditions used. Since B and C form 1:1 co-crystals, recovery of pure B from such mixtures can only be achieved with great loss of material.

The formation of methyl bromide from an alkali metal bromide, methanol, and sulfuric acid is in principle well documented in prior art: Organic Syntheses Coll., Vol. II (1948) 280; A. Bygden, J. Pract. Chem. 102 (1921) 363 and 104 (1922) 285; F. Ullmann, Encycklopadie der Tech. Chemie, Vol. 4, 750; Czeck. Patent 106:120 (C.A. 60, 1587b). The subject regeneration processs, however, contains an energy-consuming concentration step where water is removed by distillation. It is important for the process economy that this water removal be minimized. It is equally important both from process economy and waste standpoints, that consumption of methanol and sulfuric acid, as well as the loss of bromine values and the formation of side products, be kept at a minimum. Process parameters have been found which satisfy all these requirements. These process parameters are far removed from those of the prior art.

SUMMARY OF THE INVENTION

It has now been found that methyl bromide can be used to methylate Compound A to Compound B in high yield. Furthermore, if the mother liquors from this methylation reaction are concentrated and treated with methanol and sulfuric acid, a nearly quantitative regeneration of methyl bromide occurs. The methyl bromide thus generated is of good quality and can be used directly in the methylation reaction. The net result of this combination process is that only low-cost materials, methanol and sulfuric acid, are consumed and that the waste problems are minimized.

The finding that methyl bromide can be used to methylate Compound A to Compound B in high yield is surprising, since use of several other methylating agents gave large proportions of Compound C. Furthermore, it has been found that the reaction rate using methyl bromide is significantly greater than the reaction rate using methyl iodide. This is particularly surprising since it is a generally accepted fact that methyl iodide is more reactive than methyl bromide.

Furthermore, the finding that methyl bromide is generated nearly quantitatively and in good purity from relatively dilute alkali bromide solutions using only a slight excess of methanol and sulfuric acid above the equimolar amounts is surprising. The prior art requires that either little or no water be present or when more water is present that a huge excess of sulfuric acid be used.

Methanol and sulfuric acid are inexpensive and readily available in large quantities, whereas methyl iodide is not. Therefore, the present invention makes practical the large-scale production of Compound B by methylation of Compound A.

As stated above, the methylation of Compound A to Compound B with $CH_3I$ works well under a variety of conditions. For obtaining a high yield of Compound B, the methylation with $CH_3Br$ is much more dependent upon process parameters, especially solvent and temperature, as described below.

The prior art discloses formation of methyl bromide under a wide variety of conditions. The process parameters which satisfy the provisions outlined above for the regeneration process, however, were found to be narrow.

DESCRIPTION OF THE INVENTION

PROCESS PARAMETERS

A. The Methylation

The initial concentration of A should be between 5 and 35%. A higher concentration of A leads to process difficulties due to the physical properties of the reaction mixture. A lower concentration of A requires process equipment of unnecessarily large volume and leads also to increased yield losses due to the water solubility of B. A concentration of 15–25% of A is preferred.

Mole ratio of $CH_3Br$ to Compound A should be in the range of 1 to 1.5. Less $CH_3Br$ gives incomplete reaction; more increases cost without process benefit and can lead to side reactions. The preferred range is about 1.05 to 1.2.

Methyl bromide can be added all at once or gradually. Gradual addition is preferred because it increases the purity of the product.

The reaction is conducted in the presence of a base; NaOH and KOH are suitable. NaOH is preferred because of cost.

The reaction must be conducted in water or a mixture of water and an organic liquid in which the weight ratio of water to organic liquid is at least 60:40, preferably at least 75:25. Water alone is preferred, provided the reaction temperature is about 0°C. or higher. If a reaction temperature considerably below 0°C. is used, a cosolvent is required to maintain a liquid phase. Suitable organic liquid (cosolvents) include methanol, ethanol, isopropanol, acetone, methyl ethyl ketone and dimethyl formamide. Methanol is preferred. For the methylation process liquors to be suitable for methyl bromide regeneration without further processing, the reaction must be conducted in water or in a mixture of water and methanol.

The reaction is conducted at a pH in the range of 10–14, preferably at pH 11.7 to 12.3. At higher pH, loss of A and B (and C) occurs due to basic hydrolysis. At lower pH, the formation of C increases.

Reaction temperatures are in the range of −15°C. to +30°C., preferably about +5°C. to +15°C. At lower temperatures, the rate of reaction is slow. At higher temperatures, the formation of C increases.

Pressure can be atmospheric or autogenous. If a closed reactor is used, the autogenous pressure will depend upon mode of $CH_3Br$ addition and solvent system used, as well as temperature. Use of atmospheric pressure requires a suitable condenser. Atmospheric pressure is preferred. Reaction time will be about 0.5 hour to 5 hours, depending upon the reaction conditions. Shorter reaction times result in large starting-material recoveries. Longer reaction times are unnecessary and may lead to hydrolysis losses.

B. The Methyl Bromide Regeneration

The filtrate and wash liquors from the methylation reaction when the reaction is conducted in water or a mixture of water and methanol are first neutralized with sulfuric acid to pH 6.7 to 7.3 in order to precipitate unreacted starting material, Compound A. At higher pH, incomplete recovery of A results. At lower pH, loss of hydrobromic acid may occur in the subsequent concentration step. Phosphoric acid can be substituted for the sulfuric acid used in this neutralization. Use of hydrochloric acid, for instance, will result in a mixture of methyl bromide and methyl chloride in the regeneration step.

After A has been recovered by filtration, the resulting filtrate is concentrated by removal of water by distillation at atmospheric or reduced pressure to a water content of 40–50% by weight. Preferred water concentration is 40–45%. At lower water concentrations, a thick slurry results, representing agitation problems. Lower water concentrations also promote formation of by-products in the regeneration step. Higher water concentrations result in decreased methyl bromide yield unless the sulfuric acid charge is substantially increased, which is uneconomical and increases the waste problem.

To the concentrate is charged methanol in a 10–30% (by weight) excess and then sulfuric acid, also in a 10–30% excess above the required equimolar amounts calculated on alkali bromide present. Preferred excess of both reagents is 15–25%. Smaller charges result in a methyl bromide yield loss. Larger charges are wasteful.

When about 75% of the sulfuric acid amount has been added, methyl bromide starts to distill. The rate of the first part of the methyl bromide generation is regulated by the addition of the last part of the sulfuric acid. Then external heating is applied at such a rate as to give a near constant flow of methyl bromide. The reaction is complete in two to three hours.

EXAMPLES

Examples 4 and 5 illustrate the preferred embodiment of this invention. Examples 2, 3, and 6 illustrate use of water/organic solvent media. Parts and percentages are by weight except as otherwise noted.

EXAMPLE 1

A solution was prepared from 100 parts 4-amino-6-t-butyl-3-mercapto-1,2,4-triazin-5-one (compound A), 450 parts water and 40.2 parts 50% sodium hydroxide. The solution was cooled to between 0° and 2°C. and stirred while 50 parts methyl bromide was added during 1 hour. The resulting mixture was stirred an additional 2 hours during which time the pH dropped towards 7, indicating the end of the reaction. The solid precipitate was then filtered, washed and dried yielding 89 parts of 4-amino-6-t-butyl-3-methylthio-1,2,4-triazin-5-one (Compound B), m.p. 119°–122°C. The presence of around 3% 4-amino-6-t-butyl-2-methyl-3-thio-1,2,4-triazin-3,5-dione (Compound C) in the product was found by NMR-analysis.

EXAMPLE 2

A solution of 16 parts 4-amino-6-t-butyl-3-mercapto-1,2,4-triazin-5-one in 8 parts 50% sodium hydroxide, 40 parts water and 16 parts methanol was reacted with 5.2 volume parts methyl bromide at −7°C. The reaction was completed in 4.0 hrs., yielding 16.1 parts of 4-amino-6-t-butyl-3-methylthio-1,2,4-triazin-5-one, m.p. 120°–122°C. Around 2.5% 4-amino-6-t-butyl-2-methyl-3-thio-1,2,4-triazin-3,5-dione was detected in the product.

EXAMPLE 3

Substituting acetone for methanol in Example 2 leads to 16 parts Compound B containing a small amount of byproduct Compound C.

EXAMPLE 4

A solution of pH 12.0 was prepared from 100 parts 4-amino-6-t-butyl-3-mercapto-1,2,4-triazin-5-one (Compound A), 450 parts water, and around 40 parts 50% sodium hydroxide. The solution was cooled to 10°C. and stirred while 50 parts methyl bromide was added during 1 hour. The resulting mixture was stirred an additional two hours at 10°C., during which time the pH was maintained at 12.0 by base addition. The solid precipitate was then filtered, washed, and dried, yielding 98 parts of 4-amino-6-t-butyl-3-methylthio-1,2,4-triazin-5-one (Compound B), m.p. 119°–122°C. The presence of less than 4% 4-amino-6-t-butyl-2-methyl-3-thio-1,2,4-triazin-3,5-dione (Compound C) in the product was found by NMR-analysis.

EXAMPLE 5

The combined filtrate and wash liquors from Example 4 were neutralized by concentrated sulfuric acid to pH 7. A precipitate of 5 parts of the starting material Compound A was filtered off for use in the next batch. The resulting filtrate was concentrated down to a water content of 45% by weight yielding 100 parts of a thin slurry. To this slurry was added 3 parts sodium bromide as make-up, followed by 19 parts methanol, and then slowly and with stirring, 61 parts concentrated sulfuric acid. Towards the end of the sulfuric acid addition, methyl bromide started to distill. Heating was then applied in such a manner that a constant distillation rate of methyl bromide was maintained. After 2 hours, 50 parts methyl bromide of good purity had been collected. This methyl bromide was used directly in the next methylation batch (Example 4).

EXAMPLE 6

A solution of 16 parts 4-amino-6-t-butyl-3-mercapto-1,2,4-triazin-5-one in 9 parts 50% potassium hydroxide, 40 parts water, and 13 parts methanol was reacted with 8 parts methyl bromide at −5°C. A pH close to 12 was maintained by addition of 2N potassium hydroxide. The reaction was completed in 4.0 hours, yielding 16 parts of 4-amino-6-t-butyl-3-methyl-thio-1,2,4-triazin-5-one, m.p. 120°–122°C. Less than 2.5% of Compound C was detected in the product.

I claim:

1. In the process of synthesizing the compound

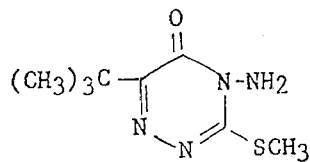

B by methylating the compound

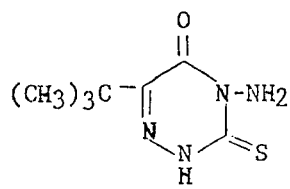

A in the presence of a base in an aqueous medium, the improvement which comprises using methyl bromide as the methylating agent and regenerating the methyl bromide by reacting the process liquors with methanol and sulfuric acid.

2. In the process of synthesizing the compound

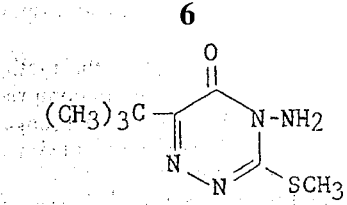

B by methylating the compound

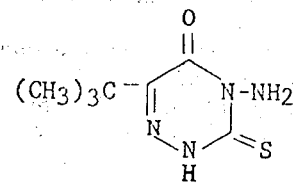

A in the presence of a base in an aqueous medium, the improvement which comprises using methyl bromide as the methylating agent.

3. Improved process of claim 2 wherein
   a. the mole ratio of methyl bromide to Compound A is in the range of 1–1.5 and
   b. the methylation is conducted
      1. in water or a mixture of water and an organic liquid selected from methanol, ethanol, isopropanol, acetone, methyl ethyl ketone, and dimethylformamide, the weight ratio of water to organic liquid being at least 60:40;
      2. in the presence of a base selected from hydroxides of sodium and potassium; and
      3. at pH in the range 10–14, temperature in the range −15°C. to +30°C. and at atmospheric or autogenous pressure.

4. Improved process of claim 2 wherein
   a. the mole ratio of methyl bromide to Compound A is in the range of about 1.05 to 1.2 and the methyl bromide is added to the reaction mixture gradually;
   b. the methylation is conducted
      1. in water or a mixture of water and an organic liquid selected from methanol, ethanol, isopropanol, acetone, methyl ethyl ketone, and dimethyl formamide, the weight ratio of water to organic liquid being at least 75:25;
      2. in the presence of sodium hydroxide; and
      3. at pH in the range of about 11.7 to 12.3, temperature in the range of about +5°C. to +15°C. and at atmospheric pressure.

5. Improved process of claim 1 wherein, for the methylation,
   a. the mole ratio of methyl bromide to A is in the range 1–1.5 and
   b. the methylation is conducted
      1. in water or a mixture of water and methanol, the weight ratio of water to methanol being at least 60:40;
      2. in the presence of a base selected from hydroxides of sodium and potassium; and 3. at pH in the range 10–14, temperature in the range −15°C. to +30°C. and at atmospheric or autogenous pressure and wherein the step of regenerating the methyl bromide from the methylation step liquors comprises
- a. neutralizing the liquors to a pH in the range of 6.7 to 7.3 by addition of an acid selected from sulfuric and phosphoric;
- b. filtering to remove the unreacted Compound A;
- c. concentrating the filtrate by removal of water by distillation at atmospheric or reduced pressure to a water content of 40–50% by weight;
- d. charging the concentrate with methanol in a 10–30% excess;
- e. charging the concentrate with sulfuric acid in a 10–30% excess; and
- f. commencing distillation of methyl bromide when approximately 75% of the sulfuric acid amount has been charged.

6. Improved process of claim 5 wherein, for the methylation,
- a. the mole ratio of methyl bromide to Compound A is in the range of about 1.05 to 1.2 and the methyl bromide is added to the reaction mixture gradually and
- b. the methylation is conducted
  1. in the presence of sodium hydroxide and
  2. at pH in the range of about 11.7 to 12.3, temperature in the range of about +5°C. to +15°C. and at atmospheric pressure;

and wherein, for the regeneration,
- a. the filtrate water content is reduced to 40–45% by weight,
- b. the methanol charge is in a 15–25% excess, and
- c. the sulfuric acid charge is in a 15–25% excess.

* * * * *